Oct. 13, 1964 V. ZENTNER 3,152,974
ELECTROPLATING MAGNETIC COBALT ALLOYS
Filed July 18, 1962
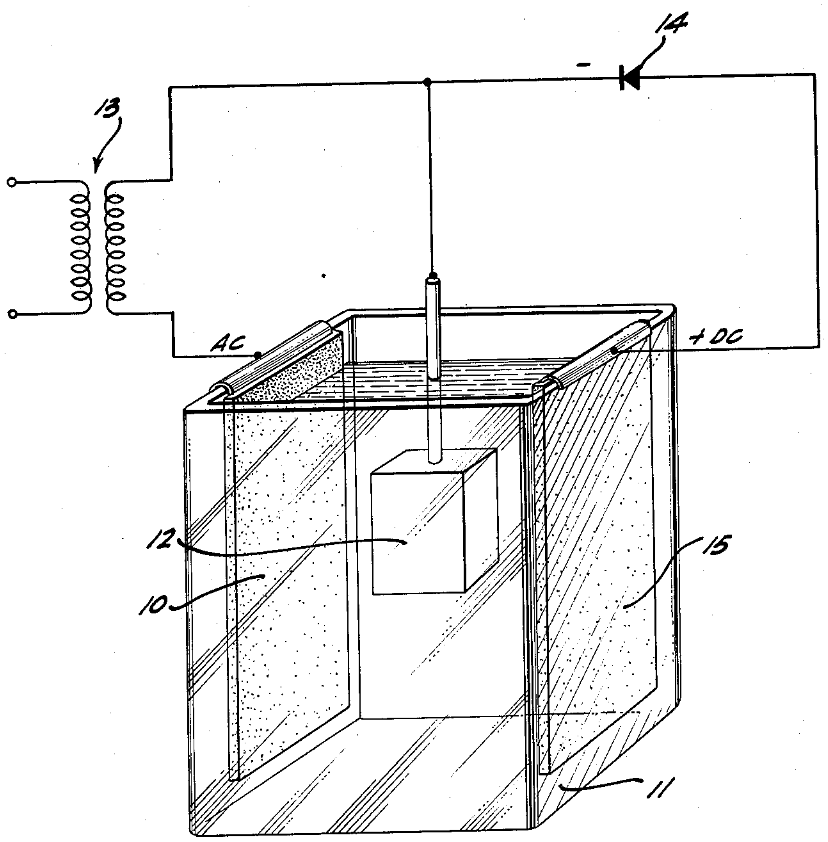
INVENTOR.
VICTOR ZENTNER.,
BY John M. Koch
ATTORNEY.

United States Patent Office 3,152,974

Patented Oct. 13, 1964

3,152,974

ELECTROPLATING MAGNETIC COBALT ALLOYS

Victor Zentner, Pacific Palisades, Calif., assignor to Hughes Aircraft Company, a corporation of Delaware Filed July 18, 1962, Ser. No. 210,794

3 Claims. (Cl. 204—43)

This invention relates to the production of electrodeposited permanent magnetic coatings, and particularly such coatings for use in magnetic recording media and having a wide range of coercivities making them suitable for a wide variety of recording purposes.

Prior art methods for the electrodeposition of cobalt alloys have resulted in the production of alloys having undesirably narrow ranges of coercivities which make them of correspondingly restricted use for magnetic recording media. For example, the usual range of coercivities available in such prior art alloy coatings is in the range from about 200 to about 300 oersted. Even drastic changes in the conditions of deposition of cobalt alloys, when using prior art methods, has resulted in only very small variations in magnetic properties, such as coercive force and remanence. Suitable electrodeposited magnetic coatings having a suitable range of magnetic properties for various magnetic recording media, such as memory drums, disks, tapes, etc., are greatly needed, but are not available.

Also, the general principles governing the performance of magnetic materials produced by prior art methods are of little theoretical help in connection with the development of improved magnetic coatings. There exists no general, unified theory or hypothesis embracing the large amount of empirical data which would enable an electrochemist to predict, with even some degree of certainty, the magnetic properties of electrodeposits produced by the use of a chosen set of electrodeposition conditions. The correlation of conventional and unconventional deposition variables with magnetic properties is investigated for each electrodeposited metal or alloy in an empirical fashion, as has been the case during the past fifty years, or more.

Accordingly, it is an important object of this invention to provide an electrodeposited permanent magnetic coating having a wide range of magnetic properties, such as coercive force and remanence.

Another object of this invention is to provide an electrodeposition method, and electrodeposited permanent magnetic coatings produced by such method, which will have superior magnetic properties for use as magnetic recording media in devices such as memory drums, disks, and tapes.

Additional objects will become apparent from the following description which is given primarily for purposes of illustration, and not limitation.

Stated in general terms, the objects of this invention are attained by providing electrodeposited permanent magnetic coatings of cobalt alloys which are produced by the use of electroplating methods employing specified conditions. Included in these conditions is the use of alternating current superimposed upon direct current in the electroplating operation. Also included in the method of this invention are the proper choice of electroplating bath temperature, pH, current density and composition. In addition, it has been found that improved results are obtained when the distance between the work being plated and the alternating current electrode is carefully chosen.

A more detailed description of the invention is given below with reference to the accompanying drawing wherein a schematic circuit diagram is shown for electroplating permanent magnetic coatings in accordance with the method and coatings of this invention.

It has been found that the use of a separate alternating current electrode 10 in plating cell 11, spaced a given distance from a direct current electrode or cathode 12, results in the production of improved permanent magnetic coatings. Also, it will be noted that a minus direct current component is employed in the alternating current, in accordance with the method and apparatus of the invention shown in the drawing. A step down transformer 13 is used as the A.C. source and the secondary winding of the transformer 13 is connected directly to A.C. eletcrode 10 and to the minus pole of a rectifier 14. The output voltage of transformer 13 is from about 10 to about 20 volts.

Rectifier 14 serves as the D.C. source, and has the plus pole thereof connected directly to a D.C. electrode or anode 15. The minus pole of rectifier 14 is also connected to D.C. electrode or cathode 12, which is rotated at from about 50 to about 200 r.p.m., preferably about 70 r.p.m., during the plating operation. The output voltage of rectifier 14, which can be a selenium rectifier, is from about 5 to about 10 volts.

Suitable bath compositions for the electroplating of cobalt-phosphorous alloys of the invention, having a much higher range of magnetic properties as compared with alloys of the prior art, are exemplified by the following bath compositions:

| | Grams per liter |
|---|---|
| Cobalt as dissolved metal ions | 50 to 100 |
| Phosphorous acid | 5 to 20 |

Electroplating conditions which have been found to be advantageous for the deposition of permanent magnetic coatings of cobalt-phosphorous from the above-described bath compositions are:

| | |
|---|---|
| Bath temperature | 65° to 75° C. |
| Current density | 100 to 250 amperes D.C. per sq. ft. of plated area. |
| Bath pH | 0.8 to 1.2. |
| Radio of superimposed A.C. to D.C. | 2:1 to 5:1. |
| A.C. electrode distance from work | 0.5 to 2 inches. |

Preferred bath compositions for plating particularly satisfactory cobalt-phosphorous alloys are as follows:

| | Grams per liter |
|---|---|
| Cobalt as sulfate or chloride | 50 to 100 |
| Phosphorous acid | 5 to 10 |
| Phosphoric acid | 10 to 50 |

Deposition conditions which have been found to be advantageous for the electrodeposition of cobalt-phosphorous permanent magnetic coatings from the above-described bath compositions are as follows:

| | |
|---|---|
| Bath temperature | 68° to 72° C. |
| Current density | 100 to 200 amperes D.C. per sq. ft. of plated area. |
| Bath pH | .9 to .95. |
| Ratio of superimposed A.C. to D.C. | 4:1. |
| A.C. electrode distance from work | 0.5 to 1.0 inch. |

By the use of the above-described method, cobalt-phosphorous coatings were obtained having coercivities in the range from about 800 to about 900 oersted and remanence in the range from about 7000 to about 8000 gauss. The circuit arrangement shown in the accompanying drawing was employed for the production of these cobalt-phosphorous permanent magnetic coatings.

Suitable bath compositions for electroplating cobalt-nickel-phosphorous alloys of the invention, having a higher range of magnetic properties as compared with prior art alloys, are as follows:

| | Grams per liter |
|---|---|
| Cobalt as dissolved metal ions | 50 to 100 |
| Nickel as dissolved metal ions | 50 to 100 |
| Phosphorous acid | 5 to 20 |

Electroplating conditions which have been found to be advantageous for the deposition of magnetic coatings of these cobalt-nickel-phosphorous alloys from the above-described bath compositions are as follows:

| | |
|---|---|
| Bath temperature | 65° to 75° C. |
| Current density | 100 to 250 amperes D.C. per sq. ft. of plated area. |
| Bath pH | 0.8 to 1.2. |
| Ratio of superimposed A.C. to D.C. | 2:1 to 5:1. |
| A.C. electrode distance from work | 0.5 to 2 inches. |

Improved cobalt-nickel-phosphorous alloys have been produced by the use of the circuit diagram shown in the accompanying drawing and the following bath compositions:

| | Grams per liter |
|---|---|
| Cobalt as sulfate or chloride | 50 to 100 |
| Nickel as sulfate or chloride | 50 to 100 |
| Phosphorous acid | 5 to 10 |
| Phosphoric acid | 10 to 50 |

The following conditions for electrodeposition were employed:

| | |
|---|---|
| Bath temperature | 60° to 80° C. |
| Current density | 200 to 250 amperes D.C. per sq. ft. of plated area. |
| Bath pH | 0.7 to 1.4. |
| Ratio of superimposed A.C. to D.C. | 2:1 to 5:1. |
| A.C. electrode distance from work | 0.5 to 1 inch. |

Suitable bath compositions have been found for electroplating cobalt-tungsten alloys which have good magnetic properties. Examples of such bath compositions are given below:

| | Grams per liter |
|---|---|
| Cobalt as sulfate | 40 to 60 |
| Cobalt as chloride | 4 to 6 |
| Boric acid | 20 to 40 |

Conditions for electroplating these cobalt-tungsten alloys from the above-described bath compositions are:

| | |
|---|---|
| Bath temperature | 65° to 75° C. |
| Current density | 100 to 250 amperes D.C. per sq. ft. of plated area. |
| Bath pH | 4.5 to 5.2. |
| Ratio of superimposed A.C. to D.C. | 2:1 to 4:1. |
| A.C. electrode distance from work | 0.5 to 2 inches. |

Improved cobalt-tungsten alloys have been produced by electrodeposition while using the circuit diagram shown in the accompanying drawing and employing the following electroplating bath composition:

| | Grams per liter |
|---|---|
| Cobalt as sulfate | 55 |
| Cobalt as chloride | 5 |
| Boric acid | 32 |
| Tungsten as sodium tungstate | 2 to 6 |

The following electroplating deposition conditions have been found to produce permanent magnetic coatings of improved properties:

| | |
|---|---|
| Bath temperature | 70° C. |
| Current density | 100 amperes D.C. per sq. ft. of plated area. |
| Bath pH | 5.0. |
| Ratio of superimposed A.C. to D.C. | 3:1. |
| A.C. electrode distance from work | 0.5 to 1 inch. |

The coercive force of the cobalt tungsten coatings electroplated by the use of the above method had a coercivity of about 400 oersted and a remanence of about 6000 gauss. These properties are significantly higher than those obtainable in cobalt-nickel alloys of the prior art which generally have coercivities in the range of about 200 to about 300 oersted and remanence of about 4500 gauss.

What is claimed is:

1. A method of electroplating a magnetic coating of cobalt alloy upon an article which comprises the steps of submerging the article in an electroplating bath comprising from about 50 to about 100 grams per liter of a cobalt salt selected from the group consisting of cobalt sulphate and cobalt chloride, from about 5 to about 10 grams per liter of phosphorous acid, and from about 10 to about 50 grams per liter of phosphoric acid, maintaining the pH of the electroplating bath in the range from about .9 to about .95, maintaining the bath temperature in the range from about 68 to about 72° C., rotating the article at the rate of about 70 r.p.m., passing electrical direct current through the bath at a current density from about 100 to about 200 amperes per square foot of area of the article, simultaneously passing an alternating current through the bath while maintaining a superimposed A.C. to D.C. ratio of about 4:1, and maintaining an A.C. electrode distance from the article of about 0.5 to about 1.0 inch.

2. A method of electroplating a magnetic coating of cobalt alloy upon an article which comprises the steps of submerging the article in an electroplating bath comprising from about 50 to about 100 grams per liter of a cobalt salt selected from the group consisting of cobalt sulphate and cobalt chloride, from about 50 to about 100 grams per liter of a nickel salt selected from the group consisting of nickel sulphate and nickel chloride, from about 5 to about 10 grams per liter of phosphorous acid, and from about 10 to about 50 grams per liter of phosphoric acid, maintaining the pH of the electroplating bath in the range from about .7 to about 1.4, maintaining the bath temperature in the range from about 60 to about 80° C., rotating the article at the rate of about 70 r.p.m., passing electrical direct current through the bath at a current density from about 200 to about 250 amperes per square foot of area of the article, simultaneously passing an alternating current through the bath while maintaining a superimposed A.C. to D.C. ratio of about 2:1 to about 5:1, and maintaining an A.C. electrode distance from the article of about 0.5 to about 1.0 inch.

3. A method of electroplating a magnetic coating of cobalt alloy upon an article which comprises the steps of submerging the article in an electroplating bath comprising about 55 grams per liter of cobalt sulphate, about 5 grams per liter of cobalt chloride, about 2 to about 6 grams per liter of sodium tungstate, and about 32 grams per liter of boric acid, maintaining the pH of the electroplating bath at about 5.0, maintaining the bath temperature at about 70° C., rotating the article at the rate of about 70 r.p.m., passing electrical direct current through the bath at a current density of about 100 amperes per square foot of area of the article, simultaneously passing an alternating current through the bath while maintaining a superimposed A.C. to D.C. ratio of about 3:1, and maintaining an A.C. electrode distance from the article of about 0.5 to about 1.0 inch.

References Cited in the file of this patent

UNITED STATES PATENTS

| | | |
|---|---|---|
| 2,619,454 | Zapponi | Nov. 25, 1952 |
| 2,644,787 | Bonn et al. | July 7, 1953 |
| 2,653,128 | Brenner et al. | Sept. 22, 1953 |
| 3,073,762 | Koretzsky | Jan. 15, 1963 |